United States Patent [19]
Jarvis et al.

[11] Patent Number: 6,095,453
[45] Date of Patent: Aug. 1, 2000

[54] MOTION PICTURE FILM PLATTER SYSTEM

[75] Inventors: Ronald W. Jarvis, Westlake Village; David M. Gilmartin, Chino Hills, both of Calif.

[73] Assignee: Technicolor, Inc., N. Hollywood, Calif.

[21] Appl. No.: 08/525,914

[22] Filed: Sep. 8, 1995

[51] Int. Cl.$^7$ .................................................. B65H 18/08
[52] U.S. Cl. .................. 242/538; 242/597.7; 242/356.1; 352/128
[58] Field of Search ................. 242/538, 538.1, 242/597, 356.1; 352/128

[56] References Cited

U.S. PATENT DOCUMENTS

| | | |
|---|---|---|
| 2,103,042 | 12/1937 | Sachtleben . |
| 2,615,643 | 10/1952 | Barsam, Jr. . |
| 2,626,705 | 1/1953 | Ash . |
| 2,718,300 | 9/1955 | Goldberg et al. . |
| 3,243,137 | 3/1966 | Norman . |
| 3,450,329 | 6/1969 | Glodberg . |
| 3,753,531 | 8/1973 | Katoh . |
| 3,811,635 | 5/1974 | Goddard . |
| 3,823,890 | 7/1974 | Potts .................................... 242/328.2 |
| 4,010,910 | 3/1977 | Boudouris et al. . |
| 4,169,566 | 10/1979 | Boudouris et al. ................. 242/328.2 |
| 4,184,647 | 1/1980 | Rourke . |
| 4,625,930 | 12/1986 | Urlik .................................... 242/333.4 |

OTHER PUBLICATIONS

Modular Platter Reel Brochure, Goldberg Brothers, Incorporated Denver, Colorado—No Date.

Primary Examiner—Michael L. Gellner
Assistant Examiner—Matthew Miller

[57] ABSTRACT

There is disclosed herein a film platter system involving modifications to a platter system comprising two or more rotary film platters used in the makeup and breakdown of film for motion picture projection in theaters and the like. The system and method involves the use of a tightly wound extended length (e.g., 6,000–7,000 feet) roll of motion picture film. An adapter plate assembly is provided to be used in place of the usual center ring and plug-in control plate used in film platter systems so as to allow a core of the extended length film roll to be suitably secured to one platter for payout to a second platter in making up a film coil (e.g., 12,000 feet) for projection. In addition, a tensioner for use with one or more platters is provided to facilitate breakdown of the film roll into its extended length (e.g., 6,000–7,000 feet) roll for repackaging and shipping to the next theater. A method for make-up and break-down, as well as details of the adapter assembly and tensioner are shown and described.

7 Claims, 12 Drawing Sheets

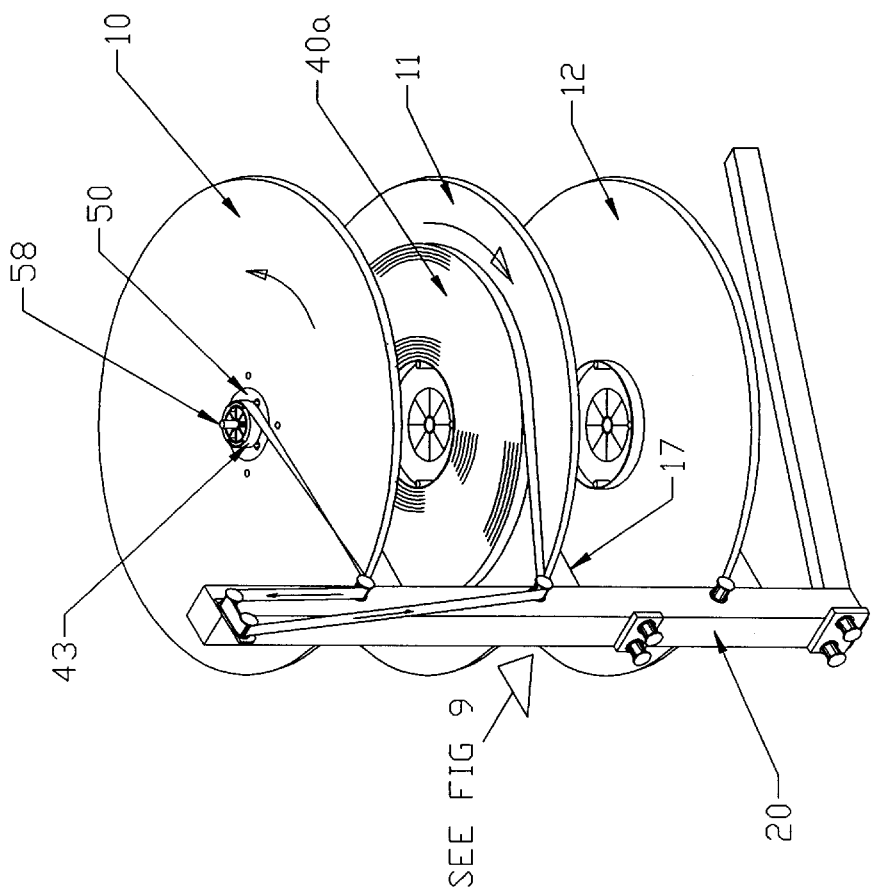
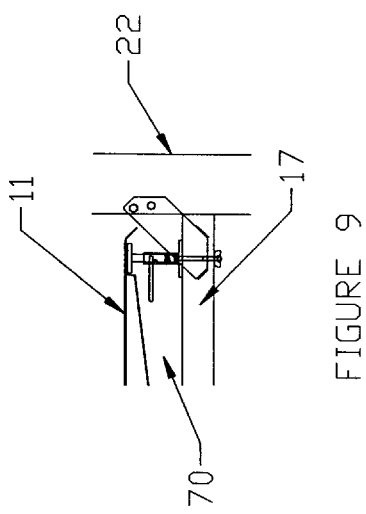
FIGURE 8
FIGURE 9

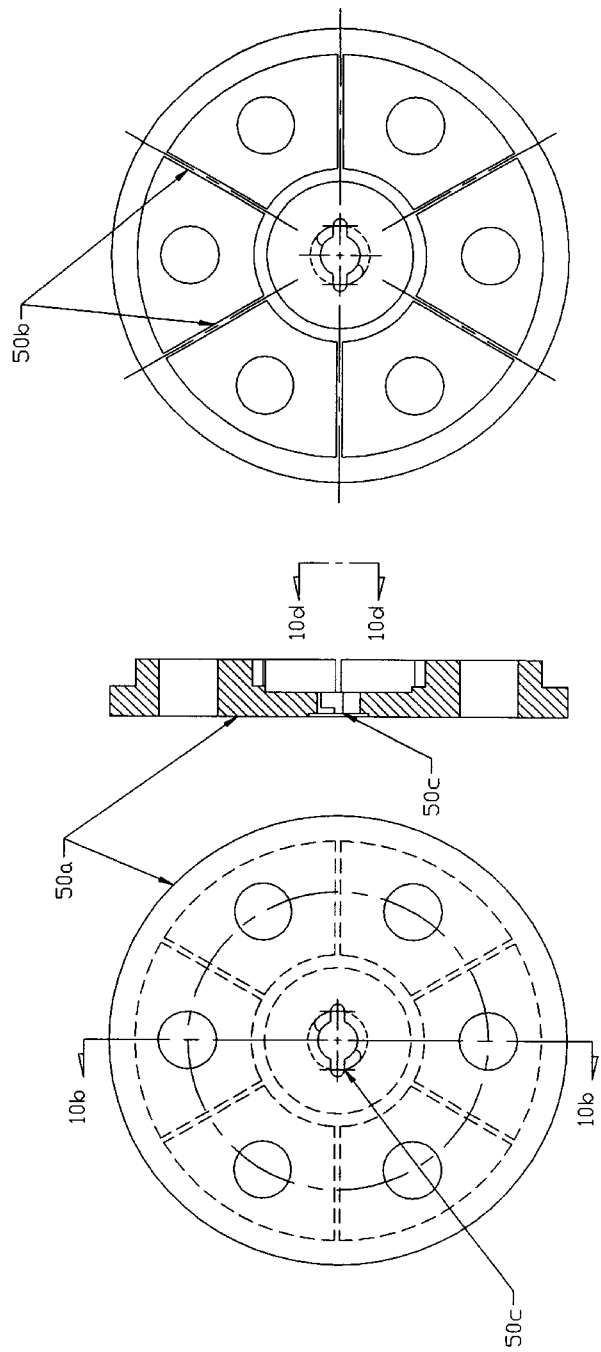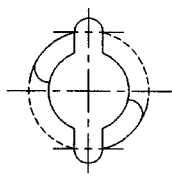

MOTION PICTURE FILM PLATTER SYSTEM

SUMMARY

The present invention relates to the field of theatrical motion picture projection, and more particularly to a system and method for make-up of motion picture film for projection from several rolls of extended length tightly wound film, and subsequent break-down thereof after the last showing of the film.

CROSS-REFERENCE TO RELATED APPLICATION

Reference is made to a concurrently filed patent application entitled "Film Carrying Case" (U.S. Ser. No. 08/525, 121, now abandoned) in the names of Ronald W. Jarvis and David M. Gilmartin, the disclosure of which is incorporated herein by reference.

BACKGROUND

Motion picture print film of the type shown in motion picture theaters is printed from negative film as a positive (print) which is tightly wound into a roll on a central core. These rolls usually are packaged in cardboard containers which are shipped to a film distributor. The roll is then wound onto a reel. A roll of film on a reel usually comprises around two thousand feet of film. Several reels of film then are placed in film shipping cases for delivery to theaters. A typical case of this nature holds one or more reels of film, usually three reels.

A feature motion picture film today usually averages around 10–12,000 or more feet of film, and therefore requires 5–7 reels of film for a feature motion picture. In the past, films were normally shown in segments from each reel, with each segment being thirty minutes or so in length. While one segment was being shown on one projector, the operator rewound the previously shown segment and then threaded the next segment into a second projector. With a system of this type, longer film segments were not generally practical, since each film reel needed to be manually loaded and unloaded from a projector. Since commercial film has considerable weight, it would have been difficult to load and unload larger reels of film.

Subsequently, an improved film transport system was developed wherein at least two horizontal platters were used with a motion picture projector and wherein the film rests in a horizontal coil on a first one of the platters, and with the film being unwound from the center of the coil and delivered to the projector. The second platter is provided with a ring, and the platter is rotated for winding the film from the projector about the ring. At the end of the particular film, the operating mode of the two platters is reversed, with the second platter becoming the supply platter and the first becoming the takeup.

Accordingly, today the two thousand foot reels of film are delivered to the theater, and they are spliced together to make up the 10–12,000 or so foot roll for projection. This is accomplished on the make-up platter in the theater projection room, an example system being a Strong Auto-Programming Platter System, and as described in their product information bulletin No. 3001. Also, U.S. Pat. No. 4,010,910 shows a similar film platter system for film make-up as well as film supply and take-up during projection.

Thus, the foregoing prior art process involves placing the usual 2,000-foot first reel of film onto a spindle of a make-up table (heads out; namely, the beginning of the film is on the outside), feeding that film to a first platter called a make-up platter of a conventional platter system of the nature previously described, followed by placing the second 2,000-foot reel on the spindle (heads out), splicing it to the first, which is now on the first platter, followed by placing the third reel on the spindle (heads out), splicing, and so on, until the full motion picture feature film is spliced together and on the first platter, usually comprising a 10–12,000 or so foot coil of film.

Once make-up is completed, the motion picture is projected by feeding the coil of film from the first platter through the motion picture projector onto a second platter. The next showing involves feeding the coil of film from the second platter through the projector to the first platter. An advantage of the platter system is that the full feature length film can all be spliced together for showing from one coil of film, and the film can be fed from the center end of the coil of film on a platter in showing the film. No rewinding is required between film showings.

After the last showing of the film, the break-down process involves feeding lengths of the film (tails first; namely, the end of the film is on the outside), usually 2,000-foot lengths, from a platter to a reel, and this continues until the several (e.g., 5–7) 2,000-foot lengths of film have been returned to the respective reels. The film is unspliced between the lengths of film. The several reels are placed in a film case or cases and are ready for shipment to the next theater. It would be desirable to minimize the handling and splicing of the large number of reels of film. Large reels of film, such as 6,000-foot reels, have been provided in the past but, unfortunately, they are very heavy and bulky and still require feeding the film from each reel on the spindle of the make-up table to a platter for make-up, and the reverse procedure for break down.

SUMMARY OF PRESENT INVENTION

According to the concepts of the present invention, extended lengths of motion picture film, such as 6,000–7,000-foot rolls, are provided in a tightly wound form on a core and without using any flanged film reels. This roll of film is removed from its shipping case and placed directly onto a platter (heads out). No feed from a make-up table is necessary. The usual control plate, sometimes referred to as "the brains," is removed from the first feed platter, and a platter core adapter according to the present invention is substituted therefor on the platter and holds the core of the extended length roll of film during make-up of the full feature coil of film.

The roll of film is supplied from the first platter which is a "feed" platter to a second "holding" platter. This is accomplished in the usual manner by a motor driving the holding platter. When this is completed, a second similar roll of extended length film (e.g., 6,000–7,000 feet) then is placed on the first feed platter (heads out), fed and spliced to the end of the first roll now on the holding platter, and then fed to the holding platter. When this process is completed, the holding platter contains the full feature length coil of film (typically 10–12,000 or so feet). The film can be fed from the holding platter through the motion picture projector to another available platter of the platter system, such as the first platter which served as the feed platter, for take-up after projection. The coil of film is fed from one platter to another through the projector in a conventional manner, usually from the center of the coil of film on the feed platter.

After the last showing of the film, the film is broken down or "dismounted" by feeding a first length from the full coil of film from the holding platter (tails first) to the take-up platter which now has attached at its center the adapter plate and the film core. It is necessary, according to the present invention, to tightly wind the length of film (e.g., 6,000–7,000 feet) onto the core so that the film roll remains in a flat and tightly packed roll so that it can be easily handled and repackaged in its film case for transport in a reel-less fashion. The take up platter is driven by its motor to pull the film from the holding platter. A brake or tension mechanism is used to provide a drag on the holding platter as it pays out the film to the take-up platter. The braking action ensures that the film roll is tightly wound onto the film core on the take-up platter. This roll (6,000–7,000 feet) is now unspliced, and the end of this roll is taped so that this extended length roll can be returned to its shipping case. A film carrier preferably is applied over the film roll prior to insertion of the roll and carrier into the case as is more fully shown and described in the above identified co-pending application. The final length (e.g., 6,000–7,000 feet) of film is similarly fed from the holding platter to the take-up platter, with the take-up platter being driven and a suitable drag being applied to the holding platter in the same manner as described above so as to ensure a tightly wound roll of film on the take-up platter. This roll is similarly returned to its film case.

The foregoing apparatus and method reduces the time and effort expended by the projection room operator because generally only two rolls of extended length reel film need to be handled, and thus only one splice (and unsplice) needs to be made in make-up (and break-down) of the feature length roll of film. Since the extended length roll of film is tightly wound and does not require a reel with flanges, the weight is reduced essentially to that of the film itself (e.g., less than 40 pounds) for facilitating handling thereof.

The operator can make-up and break-down the film in less than one-half the time previously required, and handling of the film is substantially less than before. The method and apparatus of the present invention thus saves time, is cost effective and helps to maintain the quality of the film.

Accordingly, it is a principal object of the present invention to provide an improved apparatus for make-up and break-down of motion picture film.

Another object of the present invention is to provide a new method of make-up and break-down of motion picture film.

A further object of the present invention is to provide an adapter plate for use in place of a plug-in control plate of a motion picture platter system and which receives and holds a core of an extended length roll of film.

A further object of the present invention is to provide a tension mechanism for use with a platter of a film platter system for facilitating and enabling a tight roll of extended length motion picture film to be provided during break-down of a film coil.

BRIEF DESCRIPTION OF DRAWINGS

These and other objects and features of the present invention will become better understood through a consideration of the following description taken in conjunction with the drawings in which:

FIG. 8 is a simplified perspective view showing the film path for film removal;

FIG. 9 is a fragmentary view showing a platter tensioner of the present invention;

FIGS. 10a–10c are respectively top, cross-sectional and bottom views of the platter adapter, and 10d is a detail view of the center rotational lock thereof;

DETAILED DESCRIPTION

Basic Platter System

Figure 1:
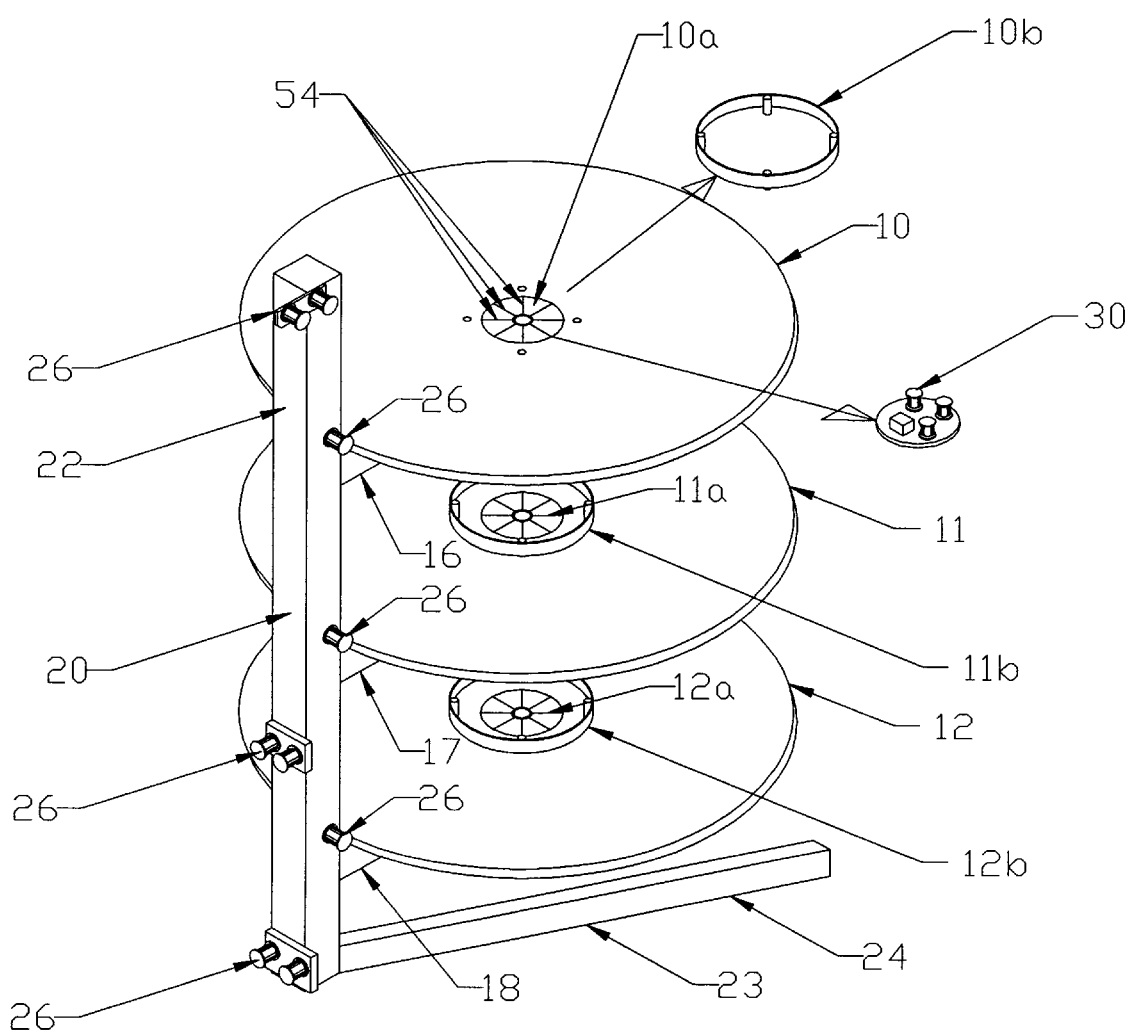
FIG. 1 diagrammatically illustrates a conventional film platter system being prepared for film loading according to the present invention.

Turning now to the drawings, and first to FIG. 1, this Figure shows a conventional film platter system comprising three platters 10–12, each supported for rotation by respective horizontal arms 16–18 (only partially seen in this Figure) which in turn are supported by a frame 20 comprising a vertical transfer arm 22 and base 23 comprising a pair of horizontally disposed legs, only leg 24 being seen in the Figure. The platters 10–12 are supported for rotation by a suitable bearing assembly (not shown) and each has an associated drive motor for rotating any one of the platters for film takeup, all as is conventional and well-known. A number of pulleys and pulley assemblies 26 are provided and are disposed on the transfer arm 22, and these serve to direct film from and to platters and from and to the associated motion picture projector (not shown), all in a conventional manner.

Each of the platters 10–12 has a central areas 10a, 11a and 12a for receiving a center or make-up ring 10b–12b or, alternatively, a plug-in control plate 30 sometimes referred to as "the brains." A center ring 10b–12b is attached to the center 10a–12a of the chosen take-up platter when film is wound onto the platter, and after the film coil (e.g., 12,000 feet or so of film) is made up (that is, fully wound onto the platter), the center ring is removed and the plug-in control plate 30 is inserted in the center. In the past, during makeup of the film coil, the reels of film received from the film distributor (e.g., 2,000-foot reels) are placed on a spindle (not shown) of a make-up table (not shown) and fed to one of the platters 10–12 onto one of the center rings 10b–12b.

The purpose of each of the center rings 10b–12b is to provide a ring onto which the film can be wound and which has a diameter sufficiently large to allow, when the center ring is removed, the plug-in control plate 30 is to be inserted into the center of a platter. The function of the control plate 30 is to direct and feed film from the center of the film coil out to the motion picture projector for projection. As the feature film is fed from one platter to the motion picture projector, it is returned to another one (take-up) of the three platters, and is fed onto and wound around one of the center rings 10b–12b. Then when projection of the feature film has been completed, the film is again ready to be fed from that take-up platter (now a feed platter) to the projector and again from the projector to another take-up platter for the next projection of the feature film. This process is continued for each showing of the film. The system and method so far described is conventional.

Exemplary Embodiment

Turning now to an exemplary embodiment of the present invention, and first to FIGS. 2–6, FIG. 2 diagrammatically illustrates a tightly wound extended length roll of motion picture film 40, such as 6,000–7,000 feet, disposed in a film case 42. The film 40 is wound on a small cylindrical central core 43 typically of plastic, and no flanged reel is used. A film carrier 44 straddles the roll of film 40 during handling and shipment thereof and basically helps keep the roll 40 flat like a pancake and does not allow the same to sag in the middle to a dished or conical configuration.

As will be discussed in more detail below, the film roll 40 and carrier 44 are removed from the case 42, the carrier 44 is removed, and the remaining film roll 40 is placed directly onto one of the platters 10–12. Either the center ring 10b or the control plate 30, whichever is positioned in the center of the platter 10–12 to be used as a feed platter, is removed from the platter, and a platter core adapter 50 (FIG. 3) according to the present invention is inserted instead.

Assuming, for example, that the upper platter 10 is to be so used as a feed platter, the adapter 50 is positioned in the central opening 10a thereof. This opening 10a has a central hub 52, which houses the platter bearing and to which the bottom support ribs 54 are welded, to receive and support the plug-in control plate 30, and the platter adapter 50 is designed to fit in its place. The platter adapter 50 has a central aperture 56 for receiving a locking pin assembly 58. The platter 10 has a plurality of support ribs 54 which are engaged by slots on the underside of the platter adapter 50 as will be discussed in more detail in connection with a discussion of FIGS. 4 and 10.

Film Loading or Make-Up

Figure 2:
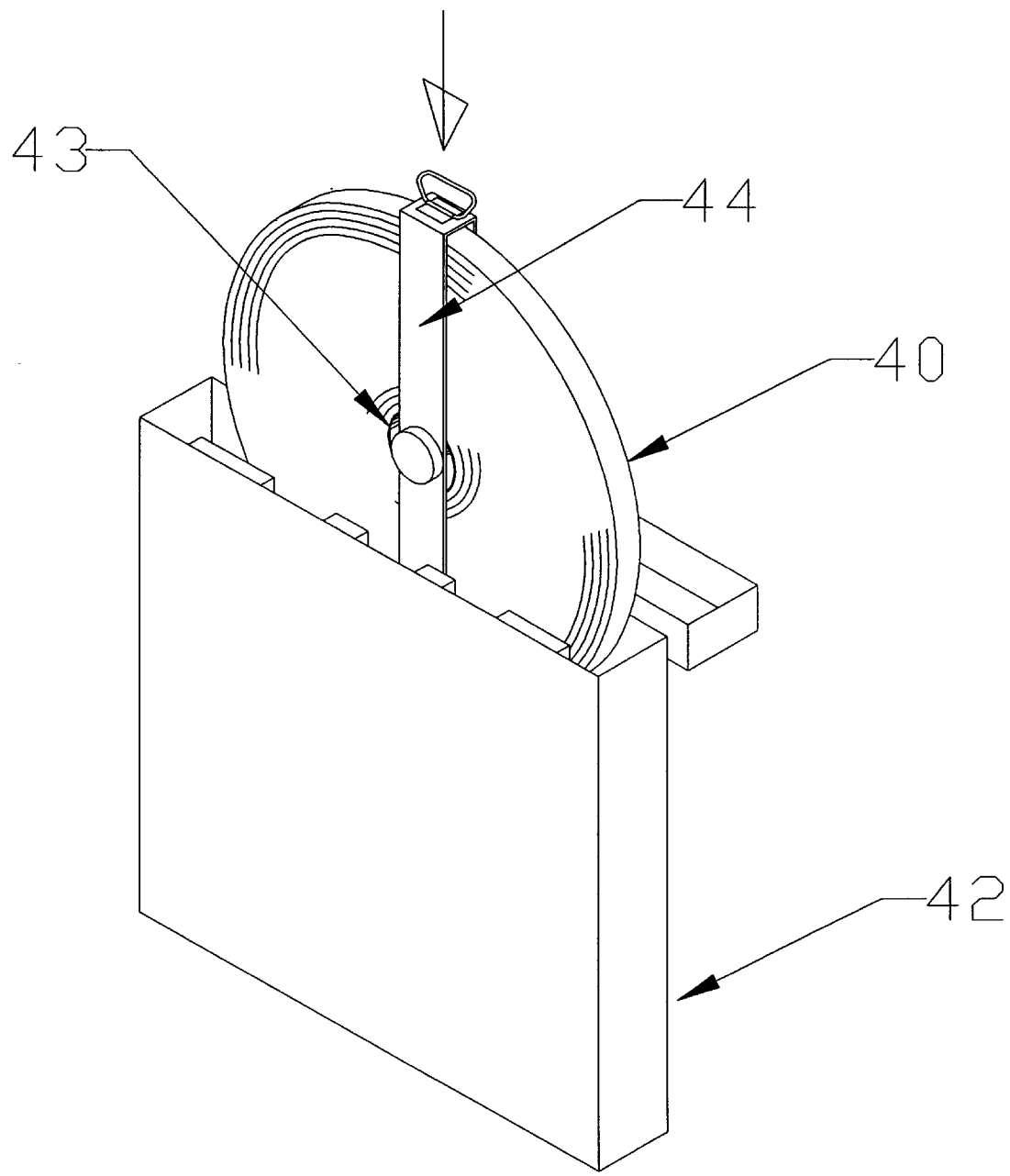
FIG. 2 is a diagrammatic and simplified view of a tightly wound extended length roll of film being removed from the case to be loaded on a platter.
Figure 3:
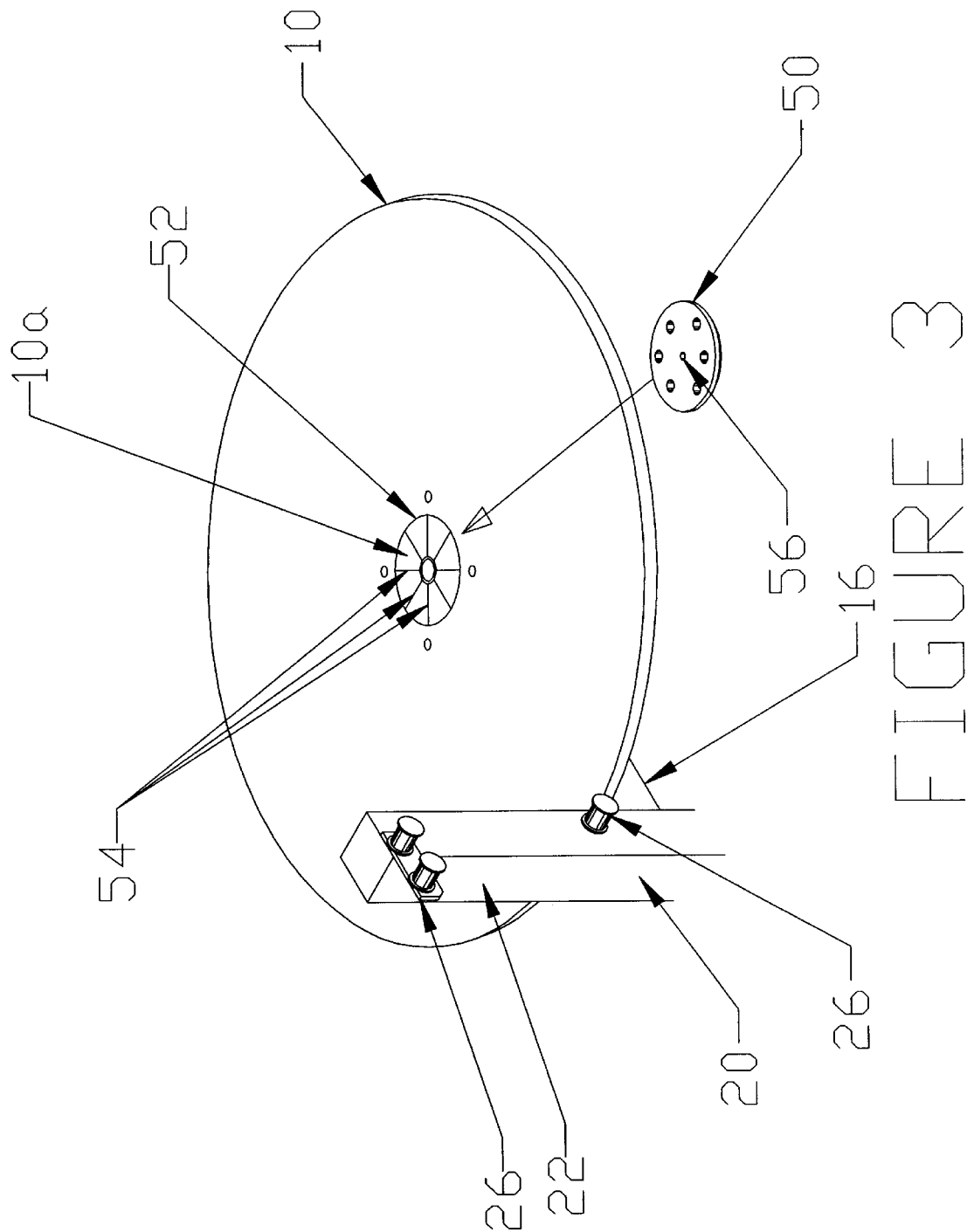
FIG. 3 is a simplified perspective view indicating placement of a platter or film core adapter according to the present invention.
Figure 4:
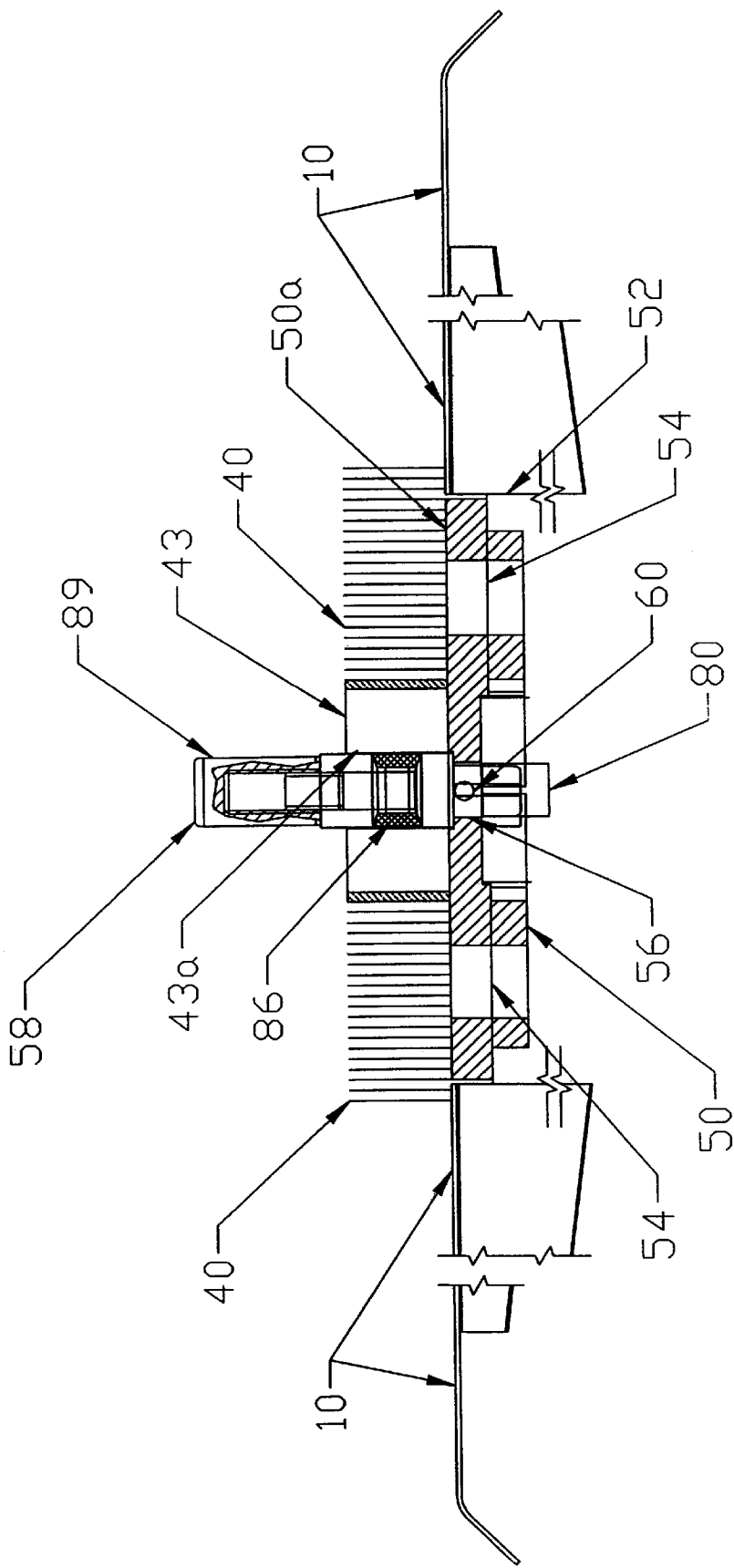
FIG. 4 is a cross-sectional view of the platter core adapter of FIG. 3, along with a partial view of the film roll and its film core and locking pin assembly.
Figure 5:
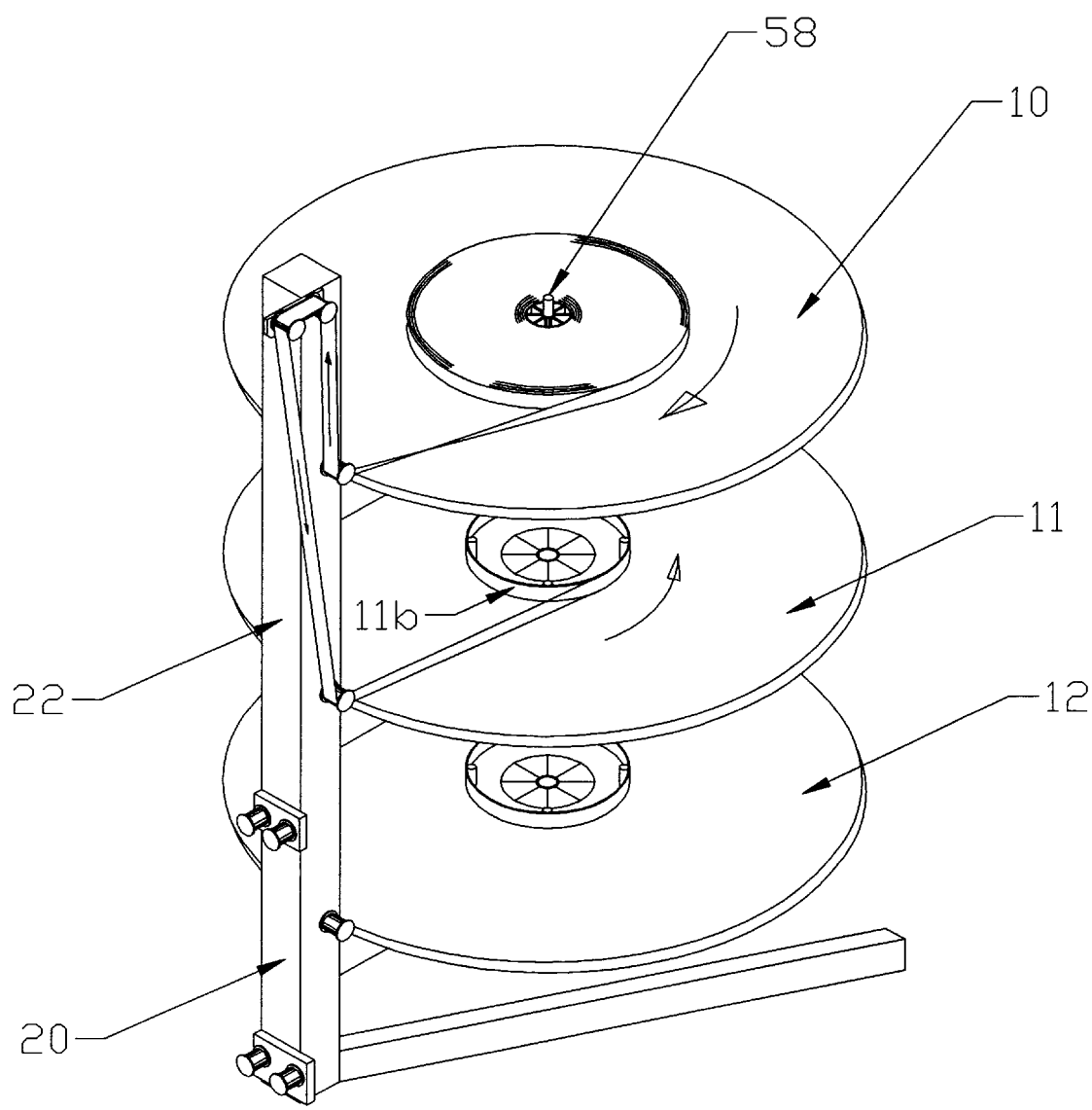
FIG. 5 is a simplified perspective view of the platter system showing the film path for loading film from a feed platter to a holding platter.
Figure 6:
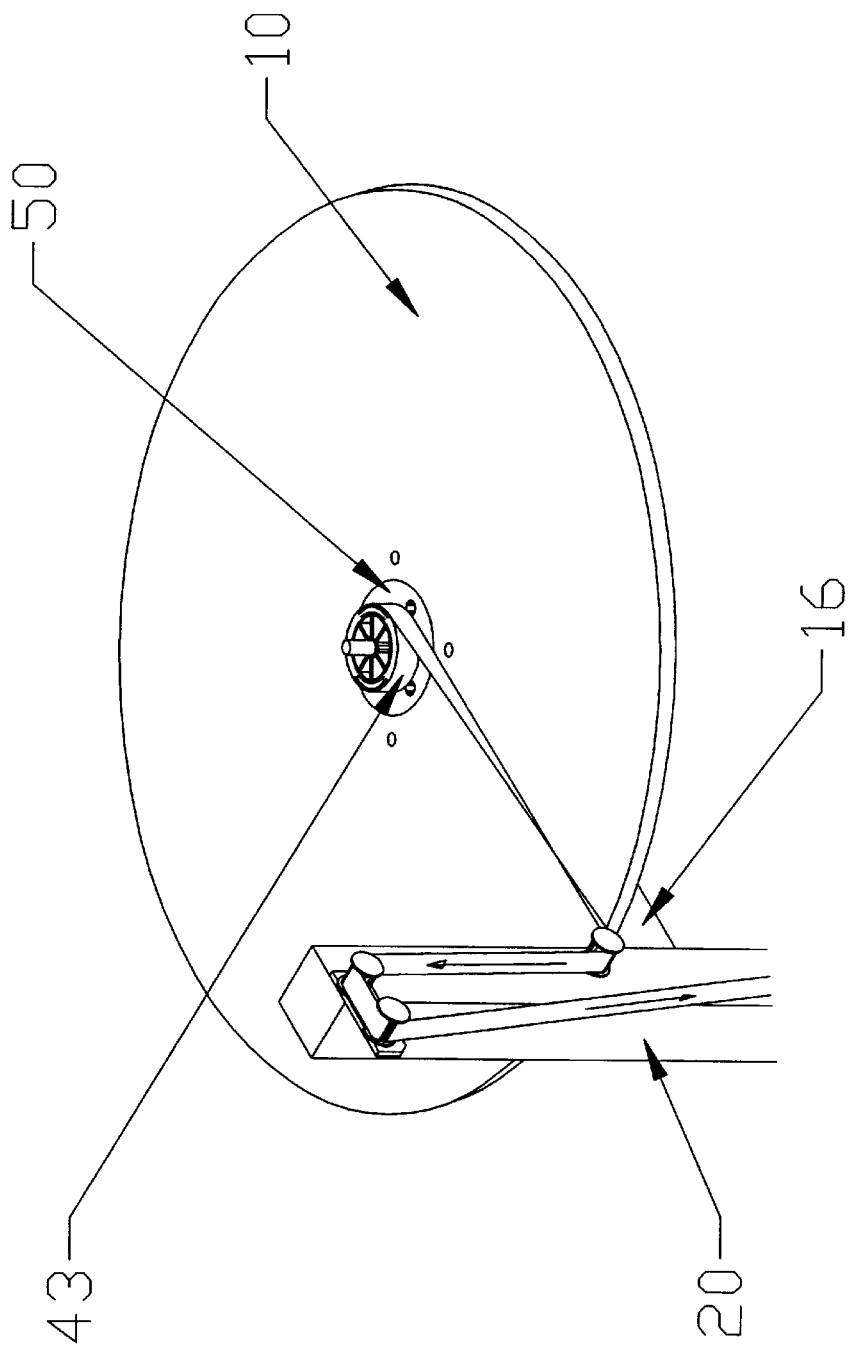
FIG. 6 is a simplified view of the feed platter upon completion of loading of a roll of extended length of film.

The loading of the film onto the platter 10 thus is accomplished as follows. The plug-in control plate 30 and/or the center ring 10b are removed from the center of the platter 10 which now is the "feed platter." A center ring 11b is installed at the center of the second platter 11 (FIG. 1) which becomes the "holding platter." The platter adapter plate 50 is inserted in the center 10a of the feed platter 10, and it is rotated until the slots on its bottom side mate with the ribs 10c so that the top surface of the platter adapter 50 is flush with the top of the platter 10 as seen in FIG. 4 and the adapter 50 cannot rotate with respect to the platter 10. The first extended length film roll 40 is removed from the case as seen in FIG. 2 and placed on the platter 10 as shown in FIG. 5. The film roll 40 is slid to the center of the platter 10 and its core 43 appropriately centered thereon. A hole 43a (FIG. 4) in the core 43 is lined up with the center hole 56 of the plate 50. A locking pin assembly 58 (FIG. 4) is inserted through the center hole 43a of the core 43 and into the center hole 56 of the plate 50 with a guide pin 60 thereof keyed to a keyslot (to be discussed later in connection with a discussion of FIG. 10) in the plate 50 so that the locking pin assembly 58 locks the film core 43 against rotation with respect to the plate 50 (which itself is locked against rotation with its slots engaging ribs 54) and with the platter 10. A compression nut 89 of the locking pin assembly 58 (which will be discussed further in connection with a discussion of FIG. 10) is tightened finger-tight to secure the core 43 onto the adapter plate 50. At the same time, the locking pin 58 is tightened, the pin rotates to interlock with the adapter plate 50 ensuring that the pin does not dislodge during operation.

The film from the outside of the film roll 40 is threaded from the feed platter 10 over suitable pulleys 26 on the transfer arm 22 down to the lower holding platter 11 as shown in FIG. 5. The end of the film is taped to the outside of the center ring 11b in a conventional manner, and then the platter 11 is rotated counterclockwise by hand for several revolutions to ensure proper film path alignment. A drive motor (not shown) for the holding platter 11 is engaged and slowly energized to rotate the platter 11 as is conventional so as to pull the film 40 from the feed platter 10. When the outer edge of the adapter plate 50 on the top feed platter 10 becomes visible (FIG. 6), the speed of the motor for platter 11 is reduced and ultimately stopped before the end of the film so that this end can be spliced to the feed end of the second film roll.

The locking pin assembly 58 then is loosened and removed, as is the film core 43, and the second film roll is placed on the feed platter 10, and the various steps discussed above are repeated for the second roll and/or any film trailers that are to be used. This constitutes the make-up of the feature film 40a (FIG. 7), and the same is ready for projection initially from platter 11 in a conventional manner. For example, the film 40a can be projected by feeding it from platter 11 and taking it up on either platter 10 or platter 12. In either case, the center ring 10b or 12b is inserted in the center of the respective platter 10 or 12 to receive the film after it is projected by the film projector. Assuming, for example, that the film is taken up on platter 10, once the film has been projected, platter 10 becomes the feed platter for the next showing wherein the film is fed from the center of the roll on platter 10 to the projector, and platter 11 or platter 12 then becomes the takeup platter.

Film Removal on Break-Down

Figure 7:
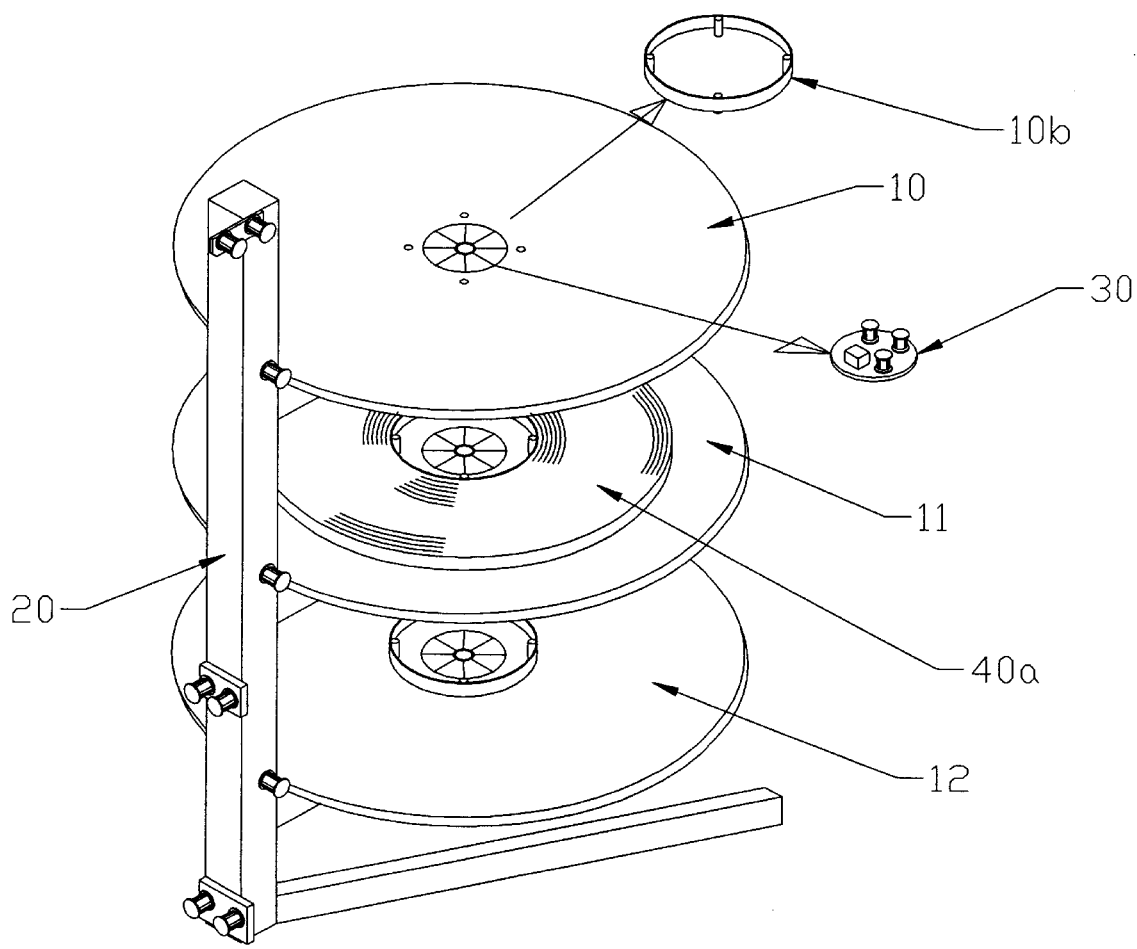
FIG. 7 is a simplified perspective view of the platter system in preparation for film removal and breakdown.

Assuming now that the last showing of the film 40 has occurred and it has ended up on the second platter 11 as shown in FIG. 7, preparation and film removal will now be discussed. The ring 10b and/or control plate 30 are removed from the upper platter 10 as seen in FIG. 7. The adapter plate 50 is again inserted in the center 10a of platter 10 and a film core 43 is appropriately locked in place with the locking pin assembly 58. The end of the film 40 is threaded over appropriate pulleys 26 and attached (e.g., taped) to the core 43 which is secured to the adapter plate 50 on the upper platter 10. The takeup platter 10 is rotated several revolutions counterclockwise by hand to ensure proper film path alignment.

A tensioner 70 as diagrammatically illustrated in FIG. 9 (and which will be discussed in greater detail in conjunction with FIG. 12) on the underside of the center platter 11 is engaged to apply drag to the platter 11 which now will be freewheeling (its drive motor is disengaged). A like tensioner if it exists is disengaged from the underside of the upper platter 10, and the drive motor (not shown) on the upper takeup platter 10 is engaged and energized to commence slow rotation of platter 10. The film path is checked for proper alignment, and the drive motor for the upper platter 10 can be sped up to pull the film from the holding platter 11. The tensioner 70 provides sufficient drag on the middle feed platter 11 to enable the film to be tightly wound on the core on the top platter 10. The platter 10 is stopped before the end of the film has run through to find the previously formed splice to be removed. The splice is removed and the film end is taped to the roll 40. The locking pin assembly 58 is loosened and removed which allows the first reel (e.g., 6,000–7,000 foot) to be removed from the upper platter 10 and returned to the film roll case of FIG. 2.

Another film core 43 is secured to the adapter plate 50 by the locking pin assembly 58 in the same manner as previously described. The remaining film on the holding platter 11 again is threaded over the appropriate pulleys 26, attached to the core 43 on the upper platter 10, and the above-described film removal procedure repeated to complete the removal of the second 6,000–7,000 feet of film.

Adapter Plate and Locking Pin Assembly

Turning now to a more detailed discussion of the platter or core adapter 50 and the locking pin assembly 58, the same are shown in greater detail in FIGS. 4 and 10. FIG. 10a is a top view of the adapter plate 50, FIG. 10c is a bottom view thereof, and FIG. 10b is a cross-sectional view taken along a line 10b—10b of FIG. 10a. The adapter plate is circular as shown with a flat top surface 50a which is dimensioned to lie flush in the same plane as the top of each of the platters 10–12. The bottom includes a plurality of radial slots 50b which are configured and dimensioned to mate with the ribs 54 in the center 10a of the platter 10 as well as those of like platters 11–12. A keyway rotation lock 50c is provided in the top and bottom surface 50a–50d to receive the key 60 of the locking pin assembly 58 as previously noted and as seen in FIG. 4 to lock the assembly 58 and core 43 against rotation with respect to the plate 50.

Figure 11A:
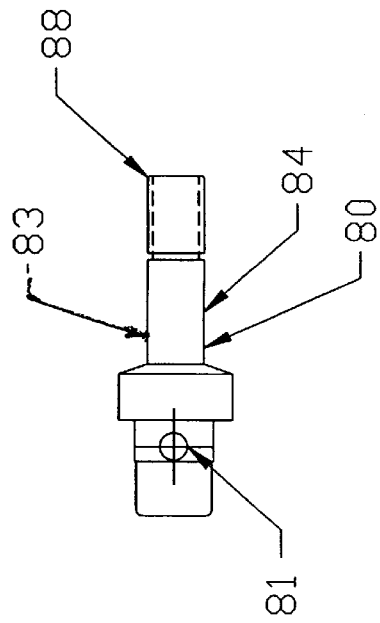
FIGS. 11a–11b illustrate details of a locking pin assembly of the adapter and respectively comprise in FIGS. 11a–11b a guide pin (side and end views), FIG. 11c an inner ring, FIG. 11d a resilient compression ring, FIG. 11e a compression collar.
Figure 11B:
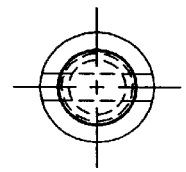
Figure 11C:
FIG. 11f a compression knob thereof.
Figure 11D:
Figure 11E:
Figure 11F:
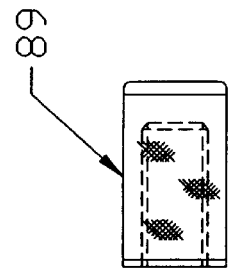

The locking pin assembly 58 is shown in greater detail in FIGS. 11a–11f and comprises a guide pin or body 80 having a key 81 which engages the rotational lock keyway 50c of the adapter plate 50 in FIG. 10. The assembly 58 further includes a cylindrical inner ring 82 (FIG. 11c) which fits over an intermediate section 83 of the pin 80, and over which is disposed a cylindrical rubber compression ring 86 (FIG. 11d), and which is retained on the ring 82 by a cylindrical compression collar 87 (FIG. 11e) on an upper section 84 (FIG. 11a) of the pin 80. The upper end of the pin 80 is threaded as indicated at 88 for receiving a compression knob 89 having internal threads as seen in FIG. 11f. The compression knob 89 can be threaded downwardly onto the guide pin 80 to cause the compression collar 87 to bear on the top of the cylindrical rubber compression ring 86, thereby causing the compression ring 86 to expand radially outwardly. This causes, as will be apparent from FIG. 4, the compression ring 86 to bear against the inner wall of cylindrical opening 43a in the core 43 thereby securing the pin assembly 58 to the core 43. Since the key 81 on the guide pin 80 engages the keyway 50c of the adapter plate 50, the core 43 cannot rotate with respect to that plate 50. The adapter plate 50 and a securing device, such as the locking pin assembly 58, to retain the film core 43 against rotation with respect to the plate 50 is important in the provision and utilization of a tightly wound extended length film roll 40 according to the concepts of the present invention.

Tensioner

Figure 12B:
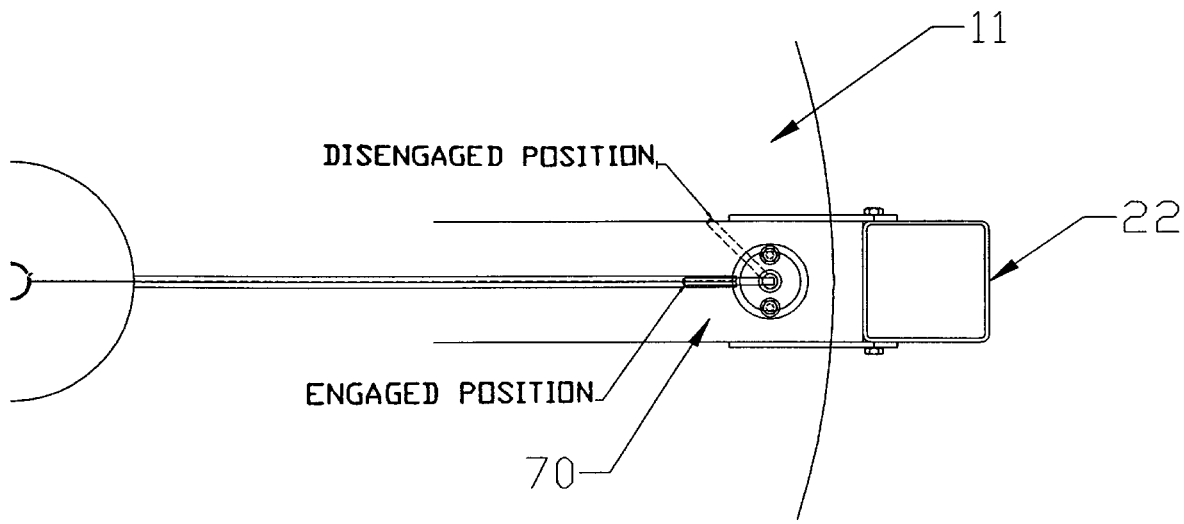
FIGS. 12a and 12b are respective elevational and top views of the platter tensioner.
Figure 12A:
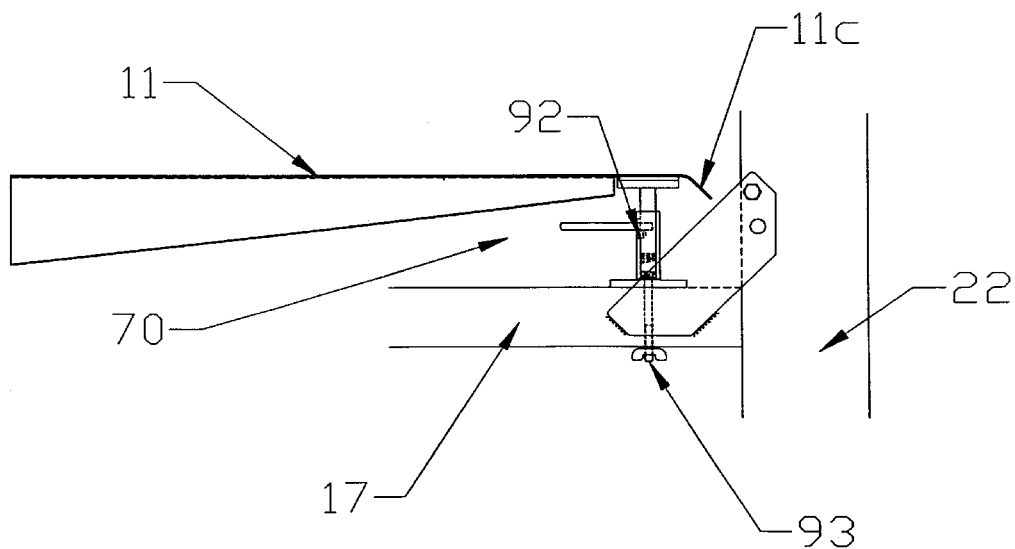
Figure 12D:
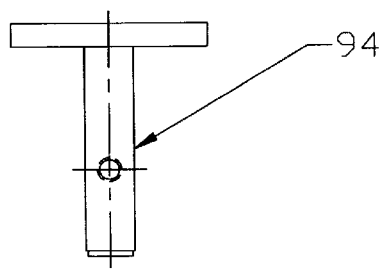
FIGS. 12c–12e are further detailed views of components of the tensioner, comprising a cross-sectional view of FIG. 12c, a plunger in FIG. 12d, and a housing in FIG. 12e.
Figure 12E:
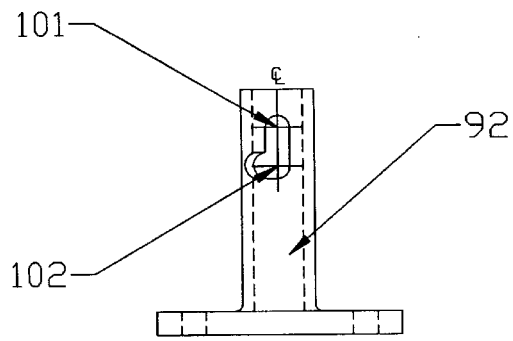
Figure 12C:
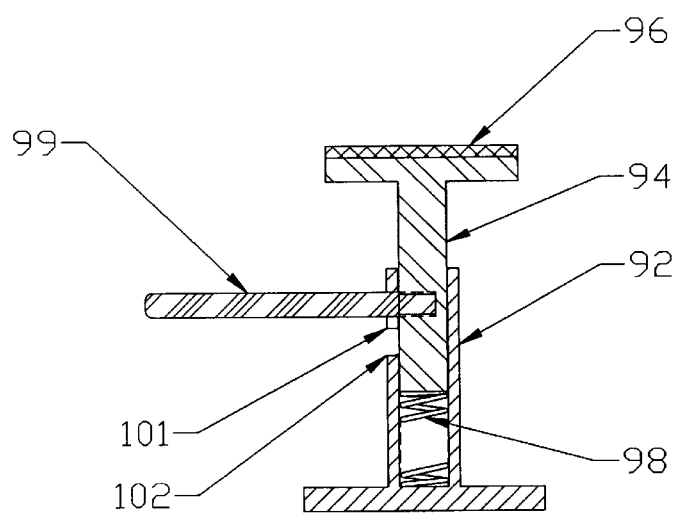

The tensioner 70 is shown in greater detail in FIGS. 12a–12d. It comprises a housing 92 attached to the top of support arm 16 in any suitable manner, such as by a threaded fastener 93 (FIG. 12a). It includes a movable plunger 94 which can be moved up and down in the housing 92 to engage and disengage the underside 11c of the platter 11 (similar tensioners 70 likewise are provided for the other platters 10 and 12). The top of the plunger includes a resilient pad 96 which bears against the underside 11c of the platter 11. The plunger 94 is biased upwardly by a coil spring 98 (FIG. 12c), and a positioning arm 99 is affixed to the plunger 94 and extends through an aperture 101 (FIGS. 12c and 12e). The arm 99 and aperture 101 allow the plunger to either be positioned upwardly (under the force of the spring 98) to engage the underside of the platter 11, or locked in a downward position in a slot 102 of aperture 101 such that the pad 96 does not engage the underside of the platter 11. The tensioner 70 is designed and configured to provide a slight drag of approximately 1.5–2.0 pounds of force on the platter 11 to ensure that as the film is taken up on the takeup platter 10 it is wound very tightly to provide 2–3 pounds of tension on the film into the film roll 40. The tight winding or packing of the film roll 40 is very important in enabling the completed roll to remain essentially flat without the center dishing if it were held by the edges of the film roll since the concepts of the present invention involve the use of a reel-less and flangeless roll of film which relies on the tight wind.

While embodiments of the present invention have been shown and described, various modifications may be made without departing from the scope of the present invention, and all such modifications and equivalents are intended to be covered.

What is claimed is:

1. A method of film makeup from a tightly wound roll of extended length motion picture film using two or more such rolls which were so wound on cores without reels or flanges, and using a film platter system having two or more rotary platters each with a flat upper surface having a central section for receiving either one of a conventional center ring for film takeup and plug-in control plate for outfeed of film to a projector, comprising the steps of attaching to the center of the first platter a platter adapter flush with the flat upper surface of the first platter, the adapter having a central hole, placing a first extended length roll of film directly onto the upper surface of the first platter, centering a hole in the core thereof with the central hole of the platter adapter, and securing the core against rotation with respect to the platter adapter, ensuring that a second platter has mounted thereon a center ring for receiving an end of motion picture film for winding thereon, threading an outer length of the first roll of film to the center ring of the second platter, and attaching an outer end of the first roll of film to the center ring on the second platter, causing rotation of the second platter to take up film from the first roll on the first platter, and removing the core from the first platter upon completion of film takeup, positioning a second roll of extended length directly onto the first platter, centering the core thereof and securing the same against rotation to the platter adapter plate on the first platter, threading and splicing an outer end of the second roll of film to an outer end of the first roll now disposed on the second platter, and causing rotation of the second platter to take up film from the second roll on the first platter to complete a full coil of motion picture film onto the second platter.

2. A method as in claim 1 including the further steps of removing the center ring from the coil of film on the second platter and substituting a plug-in control plate therefor to enable feeding of film from the second platter to a motion picture projector.

3. A method as in claim 2 further including the steps of inserting a center ring at the center of the first platter, and feeding film from a motion picture projector supplied from the second platter to the ring on the first platter for takeup of the film after projection thereof by the motion picture projector.

4. A method of film makeup from a tightly wound roll of extended length motion picture film using two or more such rolls which were so wound on cores without reels or flanges, and using a film platter system having film pulleys and having two or more rotary platters each with a flat upper surface having a central section for receiving either one of a conventional center ring for film takeup and plug-in control plate for outfeed of film to a projector, comprising the steps of removing a center ring and plug-in control plate, if then existing thereon, from a first platter, and attaching to the center of the first platter a platter adapter flush with the flat upper surface of the first platter, the adapter having a central hole, placing a first extended length roll of film on the first platter, and centering a hole in the core thereof with the central hole of the platter adapter, and securing the core against rotation with respect to the platter adapter, ensuring that a second platter has mounted thereon a center ring for receiving an end of motion picture film for winding thereon, threading an outer length of the first roll of film to the center ring of the second platter, and attaching an outer end of the first roll of film to the center ring on the second platter, causing rotation of the second platter to take up film from the first roll on the first platter, and removing the core from the first platter upon completion of film takeup, positioning a second roll of extended length on the first platter, centering the core thereof and securing the same against rotation to the platter adapter plate on the first platter, threading and splicing an outer end of the second roll of film to an outer end of the first roll now disposed on the second platter, and causing rotation of the second platter to take up film from the second roll on the first platter to complete a full coil of motion picture film onto the second platter.

5. A method of film makeup from a tightly wound roll of extended length motion picture film using two or more such rolls which were so wound on cores without reels or flanges, and using a film platter system having two or more rotary platters each with a flat upper surface having a central section for receiving either one of a conventional center ring for film takeup and plug-in control plate for outfeed of film to a projector, and a drive motor for rotating at least a second of said platters, comprising the steps of removing a center ring and plug-in control plate, if then existing thereon, from a first platter, and attaching to the center of the first platter a platter adapter flush with the flat upper surface of the first platter, the adapter having a central hole, placing a first extended length roll of film on the first platter, and centering a hole in the core thereof with the central hole of the platter adapter, and securing the core against rotation with respect to the platter adapter, ensuring that a second platter has mounted thereon a center ring for receiving an end of motion picture film for winding thereon, threading an outer length of the first roll of film to the center ring of the second platter, and attaching an outer end of the first roll of film to the center ring on the second platter, causing rotation of the second platter by its drive motor to take up film from the first roll on the first platter, and removing the core from the first platter upon completion of film takeup, positioning a second roll of extended length on the first platter, centering the core thereof and securing the same against rotation to the platter adapter plate on the first platter, threading and splicing an outer end of the second roll of film to an outer end of the first roll now disposed on the second platter, causing rotation of the second platter to take up film from the second roll on the first platter to complete a full coil of motion picture film onto the second platter, and removing the center ring from the coil of film on the second platter and substituting a plug-in control plate therefor to enable feeding of film from the second platter to a motion picture projector.

6. A method of film coil removal of spliced rolls of film from a first platter of a film platter system to form two tightly wound rolls of extended length motion picture film on cores without reels or flanges, and wherein the platter system has at least first and second rotary platters each with a flat upper surface having a central section for receiving either one of a conventional center ring for film take-up and a plug-in control plate for outfeed of film to a projector, comprising the steps of securing a film core to the central section of the second platter, threading an outer length of the film coil from the first platter to the film core on the second platter, and attaching the outer end of the film coil to the core on the second platter, applying a drag force to the first platter, causing rotation of the second platter to take up film from the first coil on the first platter while maintaining the drag force on the first platter so as to ensure a tightly wound first roll of film being made up on the second platter, terminating feed of film from the film coil to the roll on the second platter when a predetermined amount of film has been applied to the first roll on the second platter, severing a film end thereof from the coil on the first platter and securing that end to the first roll, removing the first roll of film and its core from the second platter, securing a second film core to the center section of the second platter, feeding further film from the film coil on the first platter to and attaching it to the film core now on the second platter, causing rotation of the second platter to take up film from the film coil on the first platter while maintaining the drag force on the first platter to ensure a tightly wound second roll of film being formed on the second platter, and terminating supplying film from the film coil on the first platter to the second roll on the second platter when a predetermined length of film has been supplied thereto.

7. A method as in claim 6 wherein rotation of the second platter is caused by energizing a drive motor for rotating the second platter.

\* \* \* \* \*